(12) United States Patent
Truyen et al.

(10) Patent No.: US 7,266,228 B2
(45) Date of Patent: Sep. 4, 2007

(54) MULTI-DIMENSIONAL DATA SET ANALYSIS AND MODELING WITH IMPROVED FEATURE DETECTION

(75) Inventors: Roel Truyen, Eindhoven (NL); Iwo Willem Oscar Serlie, Delft (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 781 days.

(21) Appl. No.: 10/144,530

(22) Filed: May 13, 2002

(65) Prior Publication Data

US 2003/0007673 A1 Jan. 9, 2003

(30) Foreign Application Priority Data

May 15, 2001 (EP) .................................. 01201781

(51) Int. Cl.
 *G06K 9/00* (2006.01)
(52) U.S. Cl. ........................ 382/128; 382/154; 345/419
(58) Field of Classification Search ................ 382/128, 382/154; 345/419
 See application file for complete search history.

(56) References Cited

U.S. PATENT DOCUMENTS 5,611,025 A * 3/1997 Lorensen et al. ........... 345/419
5,891,030 A * 4/1999 Johnson et al. ............. 600/407
5,971,767 A 10/1999 Kaufman et al. ........... 434/267
6,272,366 B1 * 8/2001 Vining ........................ 600/407
6,456,735 B1 * 9/2002 Sato et al. ................... 382/131
2001/0031920 A1 * 10/2001 Kaufman et al. ........... 600/431

FOREIGN PATENT DOCUMENTS

WO WO9714352 4/1997

\* cited by examiner

*Primary Examiner*—Vikkram Bali
*Assistant Examiner*—John B Strege

(57) ABSTRACT

A multi-dimensional data set assigns data values to positions in a multi-dimensional geometrical space. A visualization is derived from the multi-dimensional data set, for example, by way of a volume or surface rendering technique. The visualization is reproduced on a display and parts that have been missed in the display are detected and indicated. For example, a new representation is made on the basis of the detected missed parts, for example, from another point of view and/or another field of view.

10 Claims, 1 Drawing Sheet

MULTI-DIMENSIONAL DATA SET ANALYSIS AND MODELING WITH IMPROVED FEATURE DETECTION

Figure 1:
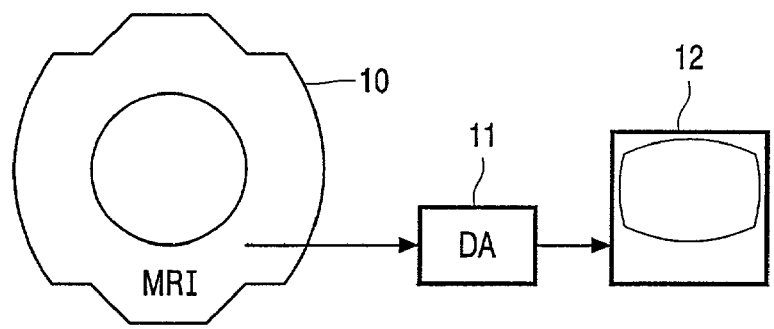

A multi-dimensional data set assigns data values to positions in a multi-dimensional geometrical space. Such a data set comprises, for example, density values, attenuation values or flow data. For example, hydrological or meteorological data is concerned, for example, flow data, or seismic or medical diagnostic density values. Such medical diagnostic data values can be acquired, for example, by means of a magnetic resonance imaging method or by means of an X-ray computed tomography method. Medical diagnostic data values of this kind represent, for example, spatial density values or attenuation values relating to the anatomy of a part of a patient to be examined.

The invention relates to a method of analyzing a multi-dimensional data set of data elements, in which method:
 the multi-dimensional data set assigns data values to positions in a multi-dimensional space,
 a visualization of the multi-dimensional data set is derived, and
 the visualization of the multi-dimensional data set is reproduced.

A method of this kind is known from the international application WO 97/14352.

Using X-ray computed tomography, in conformity with the known method a number of cross-sectional images is formed along cross-sections, transversely of the longitudinal axis, through the abdomen of the patient to be examined. Subsequently, a three-dimensional model of the intestinal tract of the patient to be examined is reconstructed on the basis of the cross-sectional images. Such a three-dimensional model constitutes a multi-dimensional data set, in this case being a three-dimensional data set. The known method forms a visualization of the three-dimensional data set in the form of a simulation of the interior of the colon. The wall of the colon is displayed on the screen of a monitor as it would be visible in the case of colonoscopy. The rendering of the simulation of the interior of the colon (wall) is used to determine whether anatomical anomalies, such as polyps, occur on the inside of the colon. It has been found in practice, however, that anatomical anomalies are frequently missed nevertheless.

It is an object of the invention to provide a method for the analysis of a multi-dimensional data set in which the risk that parts of the visualization escape attention is significantly reduced.

This object is achieved in accordance with the invention in that missed parts of the visualization of the multi-dimensional data set which have not been reproduced are detected.

The visualization of the multi-dimensional data set concerns a wide variety of operations which can be performed on the multi-dimensional data set and are suitable to reproduce the image information contained in the multi-dimensional data set in two dimensions, for example, on the screen of a monitor. Operations that are particularly suitable in this respect are, for example, surface rendering, volume rendering or iso-surface rendering. Such visualizations can be performed for a variety of geometries. Orthogonal volume rendering enables observation of a structure represented by the multi-dimensional data set from many directions; in that case it is even possible to revolve as if it were around the object. Perspective volume rendering enables as if it were a view from the inside of the structure of the object represented by the multi-dimensional data set. Furthermore, visualizations are feasible where the observer travels as if it were through the structure represented by the multi-dimensional data set while looking at the structure ahead, from behind or from the side. In less complex situations the visualization may be the multi-dimensional data set itself. For example, a two-dimensional data set itself may be reproduced as an image in the suitable data format. The invention can also be applied to a visualization previously derived from a multi-dimensional data set.

Each time a virtual point of view is associated with such visualizations. The image information in the multi-dimensional data set is reproduced in conformity with the relevant visualization as seen by an observer from the respective point of view. Generally speaking, the observer will not actually be present in the point of view so that this point is referred to as a virtual point of view. For example, the virtual point of view can be chosen so as to be situated in the interior of the structure represented by the multi-dimensional data set, whereas in practice it is impossible to take in a position in the actual structure which is located in the position which corresponds to the virtual point of view.

Usually a virtual field of view is associated with the rendering of the visualization. The virtual field of view comprises the part of the visualization which is reproduced from the point of view. The virtual field of view is the part of the structure which is represented by the multi-dimensional data set as observed by an observer or a camera which has a given field of view and is arranged in the virtual point of view.

Detection and indication of missed parts of the visualization, which are not represented, offers the user an idea of the degree of completeness of the inspection of the visualization. The invention thus enables determination whether and to what extent the structure represented in the multi-dimensional data set has been inspected. This enables the user to choose a different visualization or other points of view and/or fields of view so as to make the inspection more complete. The invention offers favorable results for applications in intestinal examinations. For example, data values of the abdomen are then acquired by means of magnetic resonance imaging, X-ray computed tomography or ultrasound. Using a suitable rendering technique, subsequently a visualization of the colon of the patient to be examined is derived. Because of the irregular structure of notably the inner wall of the colon, if no steps are taken there will be a risk that parts of the inner wall of the colon will not be represented in the rendering. In conformity with the invention such missed parts are detected and preferably also indicated. It has notably been found that polyps and other anomalies of the colon wall may be hidden behind intestinal folds and hence remain outside the virtual field of view. Such hidden polyps can usually be detected by choosing a different point of view and/or a field of view in a different direction. For example, during the visualization a camera moves as if it were through the colon of the patient to be examined. The intestinal wall can thus be reproduced from successive points of view, thus carrying out virtual colonoscopy where the rendering of the visualization corresponds to the images which would have been delivered by an endoscope introduced into the colon. It has been found that polyps are detected much more reliably by way of virtual colonoscopy by choosing in accordance with the invention the field of view to extend in the opposite direction when a missing part is involved, and hence by "looking back" or "sideways" as if it were, so that a polyp hidden behind an intestinal fold can now be observed.

Generally speaking, the invention can be advantageously used not only for medical colonoscopy but also for the analysis of multi-dimensional data sets relating to spatially complex structures, that is, structures with cavities or tubular structures which are (virtually) inspected from the inside. Other medical applications are, for example, the inspection of the internal structure of the vascular system.

These and other aspects of the invention will be elaborated hereinafter on the basis of the following embodiments which are defined in the dependent claims.

Preferably, the detected missed parts are included in the revised view or visualization generated by a "new" rendering in such a way that same detected missed parts, when presented for viewing are identifiable as separate or deviant from other image information contained within the newly rendered visualization. On the basis of the present inventive method, it is easy to make new renderings in which as many of the missed parts as possible are reproduced in the "new" rendering. The identification or newly rendered view, i.e., the new view that includes the missed parts, is readily implemented by providing missed parts in the visualization or in the multi-dimensional data set with an attribute, the "new" rendering generated on the basis of the attribute. For example, on the basis of such an attribute the parts of the visualization or the multi-dimensional data set provided with the attribute may be reproduced or generated to be different from that data which does not contain the attribute. For example, the data associated with the attribute may be displayed in a color, which color deviates from that of the surroundings. The inventions also provide for forming separate survey image of the missed parts. Such a survey image would be displayed in such a way as to clearly show which parts of the multi-dimensional data set qualify for further inspection.

In conformity with one version of the invention the missed parts are quantitatively detected and indicated. For example, the multi-dimensional data set and/or the visualizations can be built up with data elements. Such a data element contains the position in the multi-dimensional space and the associated data value. In the case of a three-dimensional data set, the data elements are voxels; pixels constitute the data elements of a two-dimensional data set.

The missed parts can be detected in a variety of ways. For example, the data elements which are situated within the virtual field of view can be determined by means of a "ray casting" algorithm. Starting from the virtual points of view, rays are then plotted in the virtual field of view and the data elements struck by such a ray are determined. Another possibility is to approximate the surface involved in the visualization by means of a network of polygons, preferably triangles. The number of polygons on the surface in the visualization is compared with the number of polygons in the rendering. Other ways of comparing the dimensions of the reproduced surface of the visualization, for example, the dimensions of the reproduced surface of an iso-surface, are also suitable. Comparison of the dimensions of the reproduced surface and the dimensions of the surface of the visualization offers a suitable, notably quantitative impression of the extent to which parts have been missed. Preferably, the ratio of the reproduced surface to the total surface of the visualization is a suitable measure of the extent to which parts have been missed.

The invention also relates to a data processor for the analysis of a multi-dimensional data set. A data processor in accordance with the invention is defined in claim 9. The analysis of the multi-dimensional data set while using the method of the invention can be readily carried out by means of the data processor in accordance with the invention. The data processor in accordance with the invention is preferably included in a computer of a medical diagnostic system, such as a computed tomography system or a magnetic resonance imaging system, or in the computer of a medical diagnostic workstation. The invention also relates to a computer program with instructions for the analysis of the multi-dimensional data set. A computer program in accordance with the invention is defined in claim 10. The computer program is loaded, for example, into the working memory of the data processor, thus enabling the data processor to carry out the method in accordance with the invention. The computer program can be stored on a data carrier such as a CD-ROM and be loaded into the working memory from the data carrier. It is also possible to download the computer program into the working memory from a network, for example, the world-wide web.

Figure 2:
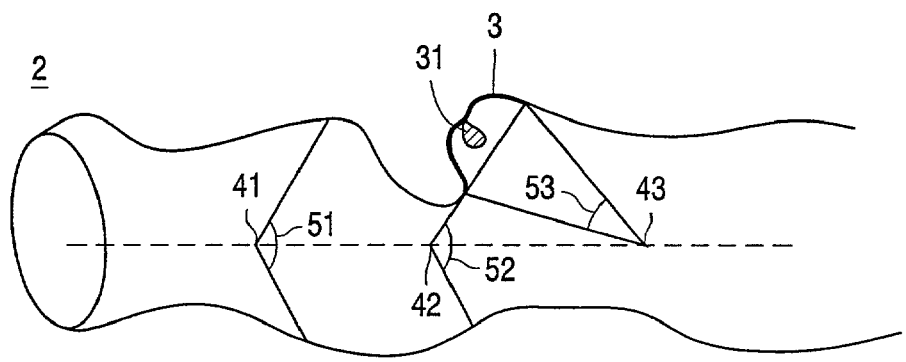
Figure 3:
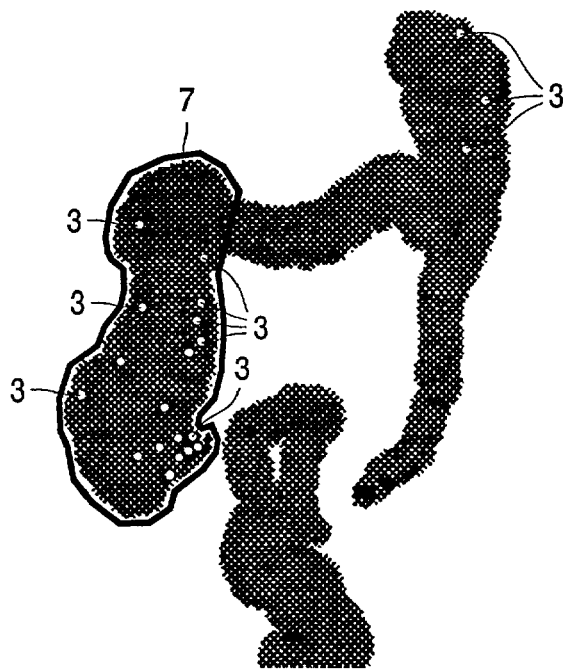

These and other aspects of the invention will be described in detail hereinafter, by way of example, with reference to the following embodiments and the accompanying drawing; therein FIG. 1 shows a medical diagnostic system provided with a data processor in accordance with the invention, FIG. 2 shows an example of the application of the method in accordance with the invention in colonoscopy, and FIG. 3 shows an example of the use of the rendering of detected missed parts in the form of a general survey image in colonoscopy.

FIG. 1 shows a medical diagnostic system provided with a data processor in accordance with the invention. FIG. 1 notably shows a magnetic resonance imaging system 10 whereby the multi-dimensional data set, for example, in the form of a three-dimensional set of density values, of the patient to be examined is reconstructed. The three-dimensional set of density values is reconstructed from magnetic resonance signals spatially encoded on the basis of magnetic gradient fields. The three-dimensional density values are applied to the data processor 11. The data processor forms the visualization, for example, a surface rendering, of the set of three-dimensional density values. The data processor also provides the rendering of the visualization for a given point of view and field of view. The data processor derives from the visualization an electronic video signal which represents the rendering for the relevant point of view and field of view. The rendering is realized on the monitor 12 by applying the electronic video signal from the data processor 11 to the monitor 12. For example, the set of three-dimensional density values relates to the abdomen of the patient to be examined and the visualization is a surface rendering which relates to the inner wall of the colon of the patient to be examined. In many practical cases successive renderings of the same visualization are formed each time with successive points of view and fields of view. The image displayed on the monitor then strongly resembles the image which would be seen if true colonoscopy were performed by means of an endoscope.

FIG. 2 shows an example of the application of the method in accordance with the invention in colonoscopy. FIG. 2 notably shows the inner wall of the colon. The inner wall of the colon forms the visualization 2 of the complete set of three-dimensional density values 1 of the abdomen. FIG. 2 also shows the virtual point of view in a number of successive positions 41, 42, 43, that is, each time with an associated field of view 51, 52, 53. FIG. 2 clearly shows that for the virtual points of view 41, 42 and fields of view 51, 52 a part 3 in an intestinal fold which extends backwards from the direction of the virtual field of view is missed in the rendering. The missed area 3 in the rendering is indicated, for example, in a different color. The missed area is subsequently reproduced as yet from a new point of view 43 with a field of view 53 in the direction opposing that of the previously used fields of view 51, 52. The missed area is thus reproduced as yet by "looking back" as if it were. A polyp 31 in the backwards oriented intestinal fold can thus be reproduced as yet.

FIG. 3 illustrates an example of the application in colonoscopy of the rendering of detected missed parts in the form of a survey image. The missed areas 3, one of which has already been discussed with reference to FIG. 2, are reproduced in a deviating color, brightness or contrast in a survey image of the intestinal track of the patient to be examined. FIG. 3 clearly shows that many missed parts occur in the area 7 and that it hence makes sense to subject the area 7 to renewed inspection with a rendering from new points of view and fields of view.

The invention claimed is:

1. A method of analyzing a multi-dimensional data set of data elements, which multi-dimensional data set includes data values corresponding to positions in a multi-dimensional space, comprising the steps of:
    reconstructing a 3D model representative of the multi-dimensional data set,
    rendering a first visualization of the multi-dimensional data set in which a part of the visualization is missing using the 3D model,
    generating a new visualization of the same multi-dimensional data set, wherein the new visualization is a rendering from a different position within the same multi-dimensional data set such that data or image parts missing from the first visualization are detected and identified in accord with the new rendering, from a different position or perspective view within the same multi-dimensional data set, and
    displaying a second visualization, which includes the missing data or image parts to generate a more complete image.

2. A method as set forth in claim 1, wherein the step of the new rendering includes that the new rendering corresponding to the second visualization is generated on the basis of the detected missed parts or data.

3. A method of analyzing a multi-dimensional data set as set forth in claim 1, wherein the step of rendering includes that each of the first and second visualizations represent a surface in the multi-dimensional data set.

4. A method of analyzing a multi-dimensional data set as set forth in claim 1, wherein the step of generating the new rendering includes generating the new rendering from a virtual point of view with a virtual field of view in the multi-dimensional space.

5. A method of analyzing a multi-dimensional data set as set forth in claim 1, wherein the step of rendering includes that parts missed in the first visualization are reproduced, based on the data utilized in accordance with a second position or perspective view to generate the new rendering corresponding to the second visualization to display same.

6. A method of analyzing a multi-dimensional data set as set forth in claim 1, wherein the step of rendering includes that the missed parts are detected on the basis of a comparison of the first visualization and the new rendering.

7. A method of analyzing a multi-dimensional data set as set forth in claim 3, wherein the step of rendering includes that the missed parts are detected on the basis of a comparison of surfaces of the first visualization and new rendering.

8. A method of analyzing a multi-dimensional data set as claimed in claim 1, wherein the step of rendering includes that the detected missed parts are annotated and reproduced with their annotation.

9. A data processor for the analysis of a multi-dimensional data set of data elements, which multi-dimensional data set includes data values representative of positions in a multi-dimensional space, which data processor comprises:
    means for rendering a first visualization of the multi-dimensional data set in which some data or image parts of the data set are not utilized, and
    means for rendering a second visualization of the same multi-dimensional data set, wherein the second visualization is a visualization of the same multi-dimensional data set using a different position or perspective view such that the data or image parts included in the multi-dimensional data set but not utilized during the first rendering are reproduced as a new rendering which illustrates the data or image parts not used in the first visualization.

10. A computer readable medium including a set of computer instructions for carrying out a method of generating varying views rendered from a multidimensional data set, based on a varied perspective, wherein data which is not included in a first rendering and visualization is detected and included in a second visualization, the instructions including:
    first rendering a first visualization of the multi-dimensional data set in which some parts or features are not included, and,
    second rendering a second visualization of the same multi-dimensional data set, wherein the second visualization is a visualization of the same multi-dimensional data set from a perspective that is different than a perspective utilized in the first step of first rendering, wherein said parts or features not included in the first visualization of the multi-dimensional data set are detected and reproduced in a new rendering which illustrates the parts or features not included in the first visualization.

* * * * *